Oct. 17, 1967

JAMES E. WEBB  
ADMINISTRATOR OF THE NATIONAL AERONAUTICS  
AND SPACE ADMINISTRATION  
LATCHING MECHANISM 3,346,929

Filed March 4, 1966

Earl V. Holman  
INVENTOR.

BY  
*J H McCoy*  
*Trude Faulconer*  
ATTORNEYS

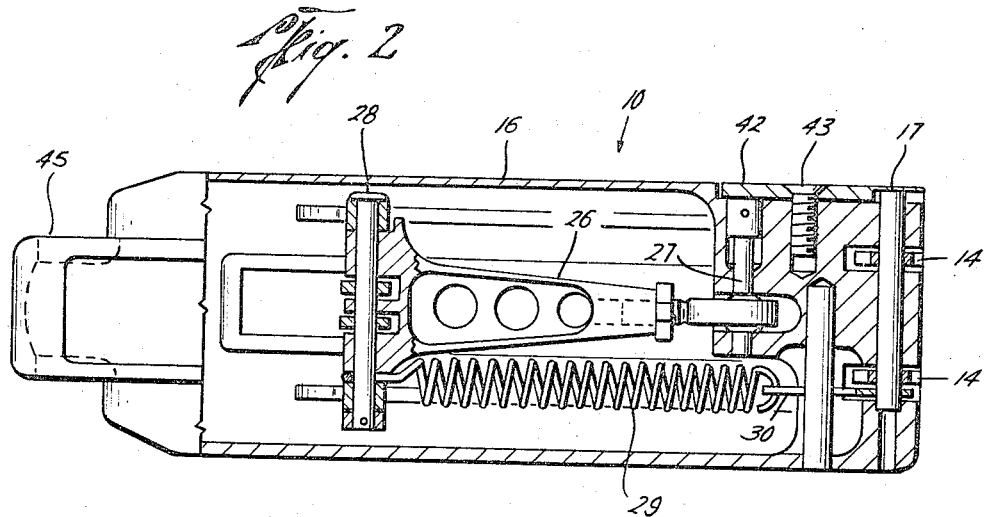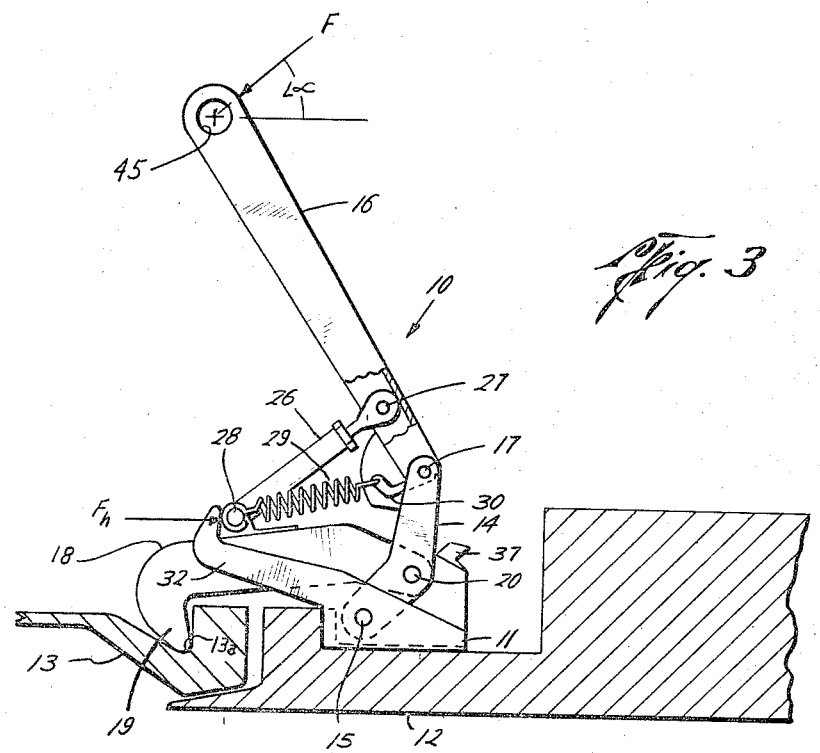

Oct. 17, 1967

JAMES E. WEBB
ADMINISTRATOR OF THE NATIONAL AERONAUTICS
AND SPACE ADMINISTRATION
LATCHING MECHANISM 3,346,929

Filed March 4, 1966

Earl V. Holman
INVENTOR.

BY
Drude Faulconer
ATTORNEYS

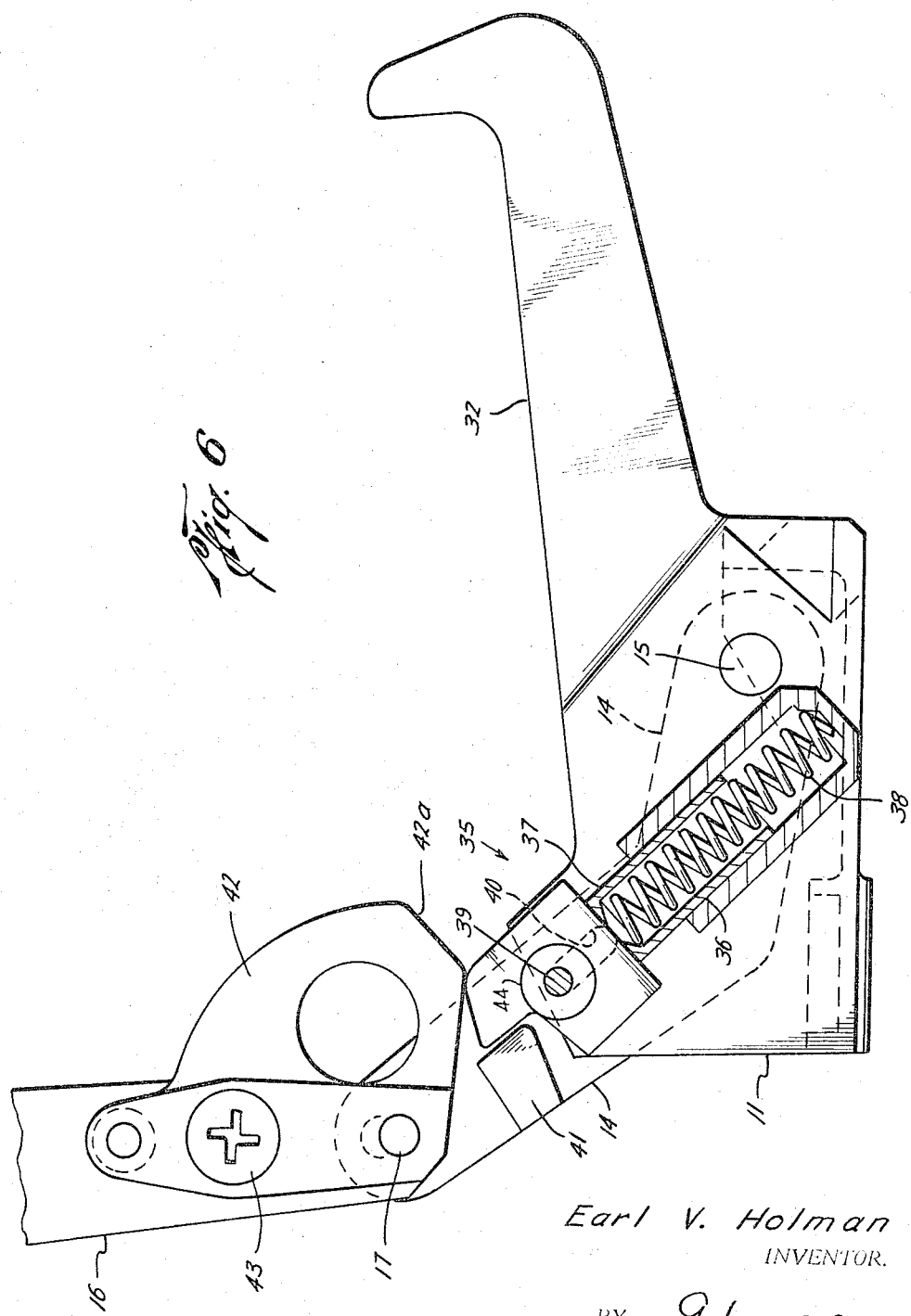

United States Patent Office 3,346,929
Patented Oct. 17, 1967

3,346,929
LATCHING MECHANISM
James E. Webb, Administrator of the National Aeronautics and Space Administration, with respect to invention of Earl V. Holman, Whittier, Calif.
Filed Mar. 4, 1966, Ser. No. 534,295
5 Claims. (Cl. 24—263)

ABSTRACT OF THE DISCLOSURE

A latching mechanism which can be operated in a limited access area and which is securely locked by movement of an operating handle in a single direction, and fully disengaged by movement of the handle in an opposite direction. The mechanism has an easily releasable latch thereon which holds the mechanism in a full-open position when it is moved to said position.

---

The invention described herein was made in the performance of work under a NASA contract, and is subject to the provision of Section 305 of the National Aeronautics and Space Act of 1958, Public Law 85-568 (72 Stat. 435; U.S.C. 2457).

This invention relates to a latching mechanism, and more particularly relates to a latching mechanism which can be operated in a limited access area and which is securely locked by movement of an operating handle in a single direction and is fully disengaged by movement of the handle in an opposite direction.

In future space flights, mission plans call for highly sophisticated docking maneuvers which require two separate vehicles to mate with each other while both are in flight. After the vehicles are properly mated they must be securely latched to each other so that a transfer of personnel, equipment, etc. can be effected between the two. The latching mechanism used in securing the vehicles to each other must be highly reliable, and must meet an exacting set of requirements, some which are as follows. It must produce high clamp-up forces; have reasonable handle loads so it can be operated manually; occupy only a small volume after latching; and be capable of being operated without the use of any special tools. Also, since such mechanisms must be operated remotely and since the access area for any remote control means is limited, the latching mechanism must be capable of being locked by a single movement in one direction and fully disengaged by a single movement in the opposite direction.

Further, since the operation of locking the latching mechanism is performed in a limited access area, the latching mechanism must be capable of being locked by a force applied to the operating handle in a single direction at angles substantially less than 90° with respect to the longitudinal axis of the base of the mechanism, as will be more fully explained below.

Known prior art latch mechanisms are unacceptable for docking operations in that such latches fail to meet several of the necessary requirements mentioned above. For example, most prior art latching mechanisms utilizing standard type toggle linkages are capable of producing the high clamp-up force required for docking operations, but such latches are not capable of being operated in a limited access area since they cannot be locked or disengaged by a single movement of their operating handles. The operating handle of these latches must first be moved in one direction to allow the hook element of the latch to engage the member to be secured, and then moved in the opposite direction to secure a tight locking position, e.g., latches commonly used on luggage, lunch pails, etc. Other prior art latches utilizing special toggle arrangements can be locked by movement of the operating handle in a single direction but such mechanisms require the final operating force to be applied to the handle in an almost vertical direction with respect to the longitudinal axis of the base of the mechanism. Where the latching mechanism is controlled remotely and the area in which such controls are to be manipulated is severly limited as in docking operations, this requirement makes the use of such mechanisms impractical. Still other types of prior art latches, such as spring-biased detents are unsuitable since they do not give the high clamp-up force required for sustained docking operations.

The present invention provides a latching mechanism which meets all of the above mentioned criteria and at the same time overcomes the shortcomings of the prior art latches. The present latching mechanism is easily locked by movement of its operating handle in one direction, and is fully disengaged by movement of the handle in the opposite direction; it develops a high clamp-up force; it is extremely reliable; and it is capable of being operated by manual, remote control in a limited access area.

The latch of the present invention comprises a base element adapted to be secured to a first member, a pair of arms each having one end pivotally connected to the base, and each having their other end pivotally connected to an operating handle, a hook or latch element pivotally connected to the arms intermediate their ends, a linkage connected between said handle and said latch element, support means on said base positioned to engage the linkage, and a tension spring means connected between the hook element and the handle. A holding means is provided on the latching mechanism to lock the latching mechanism in a full-open position whenever the mechanism is moved to such a position, This means is easily releasable by merely moving the operating handle toward the locked position.

The latch is held in the full-open position while the first and second members are moved together. The operating handle is moved forward by a remote control rod to release the holding means. Continued movement of the handle in the same direction securely latches the mechanism in a locked position. To release the latch, the handle need only be pulled in the opposite direction.

The actual construction, operation, and the apparent advantages of the invention will be better understood by referring to the drawings in which like numerals identify like parts in the different figures and in which:

FIG. 2 is a top view, partly in section, of the latch of FIG. 1;

FIG. 3 is a side view, partly in section and reduced in scale, of the latch in FIG. 1 in an intermediate position between its full-open position and its locked position;

FIG. 6 is an enlarged partial side view, partly in section, of a holding means of the latch of FIG. 1 used to maintain the latch in a full-open position.

Figure 1:
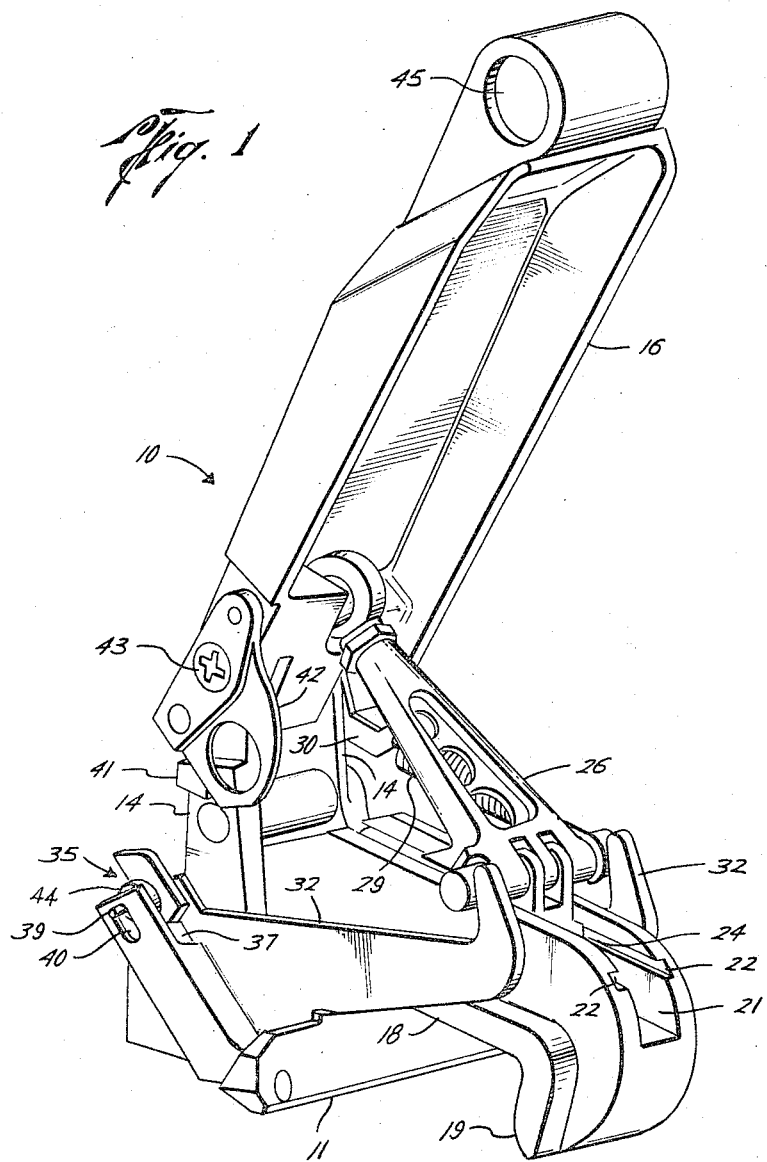
FIG. 1 is a perspective view of the latch in accordance with the present invention, in a cocked position.

Referring more particularly to the drawings, latch 10 has a base 11 which is adapted to be secured to first member 12 which in turn is adapted to be coupled to second member 13. Latch 10 has a pair of flattened V-shaped arms 14 pivotally secured at their one end to base 11 by means of pin 15, and pivotally secured at their other end to an operating handle 16 by means of pin 17. Latch element 18, which has a hook-like means 19 at one end thereof, is pivotally secured at its other end to arms 14 by pin 20.

Latch element 18 has an open, elongated slot 21 longitudinally extending along its upper edge and provided with a pair of guide grooves 22, one on either side of the slot. A link 23 having a pair of guides 24 is positioned for slidable movement within slot 21, said guides 24 cooperating respectively with said guide grooves 22, as clearly shown in FIG. 1. Movement of link 23 is limited in slot 21 by means of stop 25 which cooperates with the recess 23a on the underside of link 23 (see FIGS. 4 and 5). An adjustable linkage 26, which is pivotally secured at its one end to handle 16 by pin 27, is pivotally secured at its other end to link 23 by pin 28. Tension spring 29 is coupled at one end to link 23 by means of pin 28 and at its other end to a bracket 30 which in turn is pivotally mounted on handle 16.

Rigidly secured to base 11 are a pair of supports 32, one on either side of the latch. These supports, which have a hook-like protuberance on their outer ends, are positioned to engage pin 28 in link 23 when handle 16 is moved in a locking direction for a purpose more fully explained in the description of the operation set out below.

Figure 5:
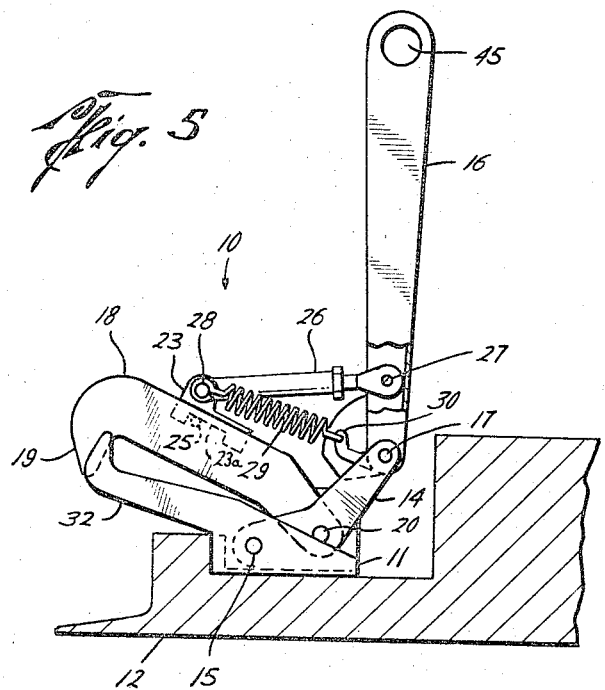
FIG. 5 is a side view, partly in section and reduced in scale, of the latch of FIG. 1 in a full-open position.

A holding means 35 is provided on latch 10 to releasably lock the latch in full-open position whenever operating handle 16 is moved to the position shown in FIG. 5. Holding means 35 (FIGS. 1 and 6) comprises a detent means 37 which has a reduced portion slidably mounted in a guide housing 36 on base 11. Spring 38 is positioned within housing 36 to normally bias detent 37 upward as viewed in FIG. 6. Pin 39 which is affixed to detent 37 passes through slot 40 in housing 36 to limit movement of the detent. A cam means is secured to handle 16 by screw 43. Cam 42 is adapted to cooperate with roller 44 on detent 37 at selected times during movement of handle 16 to depress detent 37 for a purpose that will be more fully explained below.

The operation of holding means 35 is as follows. As handle 16 is moved toward a full-open position, tension spring 29 retains handle 16, latch element 18, linkage 26, and arms 14 in a relative position to each other (FIGS. 3 and 5) and all rotate about pin 15. The sloped face of shoulder 41 contains slope face of detent 37, depressing same downward in housing 36 against the bias of spring 38. This allows the shoulder 41 on arm 14 to move behind detent 37 which in turn allows spring 38 to move detent 37 upward to engage shoulder 41 (see FIG. 6) to thereby lock arms 14 in a full-open position. With arms 14 locked, tension spring 29 will hold both handle 16 and latch element 18 in a full-open position, as shown in FIG. 5.

When it is desired to release latch 10 from its full-open position, handle 16 is rotated forward about pin 17 against the bias of spring 29 so that flattened portion 42a of cam 42 once again contacts roller 44 on detent 37 to depress same and release shoulder 41 on arms 14. This allows arms 14 to move forward to the intermediate position shown in FIG. 3. The rounded portion of cam 42 will engage roller 44 when handle 16 is moved forward to fully lock mechanism 10, as will be more fully described below, so that detent 37 is depressed and does not interfere with the locking operation.

Figure 4:
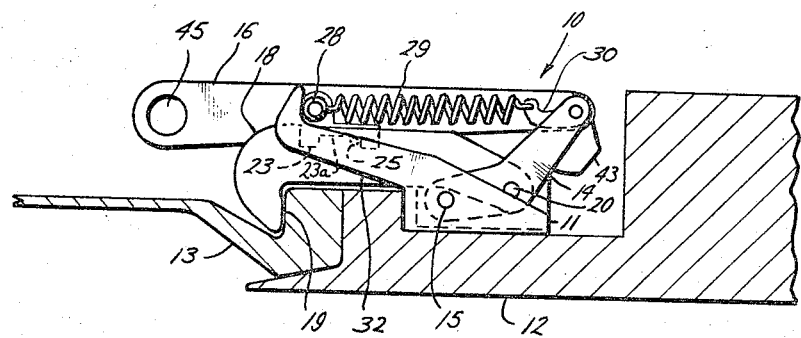
FIG. 4 is a side view, partly in section and reduced in scale, of the latch of FIG. 1 in a locked position.

The operation of latch 10, itself, is as follows. Latch 10, which has its base 11 secured to a first member 12, is normally in the full-open position shown in FIG. 5. Member 12 is moved into abutment with member 13 to which it is to be latched. Handle 16 is pushed forward (counterclockwise as viewed in FIG. 3) by a remote control rod (not shown) which can be attached to handle 16 through opening 45. As explained above, this movement of handle 16 releases holding means 45 and moves the latch to the position shown in FIG. 3. In this position, arms 14 rock forward about pivot pin 15 and hook means 19 engages a latching groove 13a in second member 13. Linkage 26 will move link 23 forward in slot 21 of element 18 until pin 28 on link 23 engages supports 32. Continued movement of handle 16 will cause the horizontal component ($F_h$ in FIG. 3) of the operating force F to be reacted at supports 32 which in turn causes arms 14 to rock clockwise about fixed pivot 15 to lock element 18 in a latched position, as shown in FIG. 4. Tension spring 29, which acts as an "over center" spring also aids in keeping latch 10 in a locked position.

As briefly mentioned above, due to the limited access area for operating the latch, it is necessary for the latching mechanism to be capable of being securely locked by a force applied to the handle at angles substantially less than 90° with respect to the longitudinal axis of the mechanism, this angle being designated as $\angle \alpha$ in FIG. 3. In those prior art mechanisms which are capable of being locked by a single movement of the operating handle in one direction, the angle ($\angle \alpha$) at which the force is applied to the handle near the end of the locking operation must approach 90° in order to insure proper latching. Through the use of supports 32 and sliding link 23, the present mechanism can be securely latched by a force applied to handle 16 at an angle ($\angle \alpha$) substantially less than 90° even during the final stage of locking the mechanism.

Although the invention has been described in conjunction with a space docking operation, it should be realized that a latch made in accordance with the present invention could be used in any environment where latches of this type are commonly used, and that the invention as set forth is intended to cover all changes and modifications which do not constitute a departure from the spirit and scope of the invention.

What is claimed and desired to be secured by Letters Patent is:

1. A latching mechanism having a locked position and a full-open position comprising:
    a base;
    a pair of arms, each arm having one end pivotally secured to said base;
    an operating handle pivotally secured to each of the other ends of said arms;
    a latch element having a hook means on one end thereof and pivotally secured at its other end to each of said arms at a point intermediate the ends of said arms;
    a link slidably mounted on said latch element;
    means to limit movement of said link on said latch element;
    a linkage pivotally secured to one end to said handle and at its other end to said link;
    a spring secured at one end to said link and at its other end to said operating handle; and
    support means on said base adapted to be engaged by said link when said operating handle is moved toward said latch element so that continued movement of said handle in the same direction will rotate said arms about the ends thereof which are pivotally secured to said base to thereby latch said mechanism in the locked position.

2. A latching mechanism as described in claim 1 including:
    cooperable releasable holding means on one of said arms and said base, respectively, for holding said latching mechanism in the full-open operative position whenever said handle is moved to said full-open position.

3. A latching mechanism as described in claim 2 wherein said cooperable, releasable holding means comprises:
    a guide housing having one end open on said base;
    detent means slidably mounted in said housing and normally extending out said open end thereof;
    means on said detent means and said housing for limiting movement of said detent means in said housing;
    means normally biasing said detent means toward the open end of said housing;
    means on one of said arms adapted to be engaged by said detent means when said latching mechanism is in a full-open position; and
    cam means on said operating handle adapted to engage said detent means to depress same whenever the handle is moved toward the full-open position and adapted to disengage the detent whenever the handle reaches said full-open position.

4. A latching mechanism as described in claim 1 including:
 releasable holding means for holding said latching mechanism in a full-open position whenever said handle is moved to said full-open position.

5. A latching mechanism having a locked position and a full-open position comprising:
 a base;
 an operating handle;
 means connecting said handle to said base;
 hook means connected to said means connecting said handle to said base;
 link means slidably mounted on said hook means;
 linkage means connecting said link means to said handle means;
 spring means connected between said handle and said hook means; and
 support means on said base adapted to be engaged by said link means when said operating handle is moved toward said hook means.

References Cited

UNITED STATES PATENTS

| | | | |
|---|---|---|---|
| 2,539,997 | 1/1951 | Graves | 224—42.1 |
| 2,726,693 | 12/1955 | Saxton | 269—94 X |
| 2,777,347 | 1/1957 | Sendoykas | 269—228 X |
| 3,104,571 | 9/1963 | Trybus | 81—380 |
| 3,170,214 | 2/1965 | Cochrane | 24—263.4 |

DONALD A. GRIFFIN, *Primary Examiner.*